US008577742B2

(12) United States Patent
Long et al.

(10) Patent No.: US 8,577,742 B2
(45) Date of Patent: Nov. 5, 2013

(54) COMMUNICATION SYSTEM WITH COMMERCIAL TRANSACTION OVERLAY WINDOW AND RELATED METHODS

(71) Applicant: New Antics, LLC, Barrington, IL (US)

(72) Inventors: Bruce K. Long, Woodland Hills, CA (US); Daryll Strauss, Redondo Beach, CA (US)

(73) Assignee: New Antics, LLC, Barrington, IL (US)

( * ) Notice: Subject to any disclaimer, the term of this patent is extended or adjusted under 35 U.S.C. 154(b) by 0 days.

(21) Appl. No.: 13/628,280

(22) Filed: Sep. 27, 2012

(65) Prior Publication Data

US 2013/0080261 A1    Mar. 28, 2013

Related U.S. Application Data

(60) Provisional application No. 61/539,680, filed on Sep. 27, 2011.

(51) Int. Cl.
*G06Q 30/00* (2012.01)

(52) U.S. Cl.
USPC ........................................ 705/26.1; 705/27.1

(58) Field of Classification Search
USPC .............................................. 705/26.1, 27.1
See application file for complete search history.

(56) References Cited

U.S. PATENT DOCUMENTS

| 7,434,723 | B1 * | 10/2008 | White et al. | 235/375 |
| 2005/0278231 | A1 * | 12/2005 | Teeter | 705/26 |
| 2009/0150262 | A1 * | 6/2009 | Mizhen | 705/27 |
| 2011/0307389 | A1 * | 12/2011 | Francia et al. | 705/67 |

OTHER PUBLICATIONS

Annonymous, "In Brief: E-Shopping for HSBC Subsidiary," SourceMedia, Jun. 15, 2001.*

* cited by examiner

*Primary Examiner* — Brandy A Zukanovich
(74) *Attorney, Agent, or Firm* — Allen, Dyer, Doppelt, Milbrath & Gilchrist, P.A.

(57) ABSTRACT

A communication system may include a server, and a computing device communicating with the server and including a display, and a processor cooperating with the display. The processor may be for receiving commercial transaction content from the server and presenting the commercial transaction content on the display, detecting a first trigger event causing a removal of the commercial transaction content from the display and presenting new content from the server on the display, and presenting the new content and an overlay window on the display, the overlay window including the commercial transaction content.

20 Claims, 8 Drawing Sheets

COMMUNICATION SYSTEM WITH COMMERCIAL TRANSACTION OVERLAY WINDOW AND RELATED METHODS

RELATED APPLICATIONS

This application is based upon prior filed copending provisional application Ser. No. 61/539,680 filed Sep. 27, 2011, the entire subject matter of which is incorporated herein by reference in its entirety.

FIELD OF THE INVENTION

The present invention relates to the field of communication systems, and, more particularly, to commercial transaction communication systems and related methods.

BACKGROUND OF THE INVENTION

Online purchasing has grown to form a large part of the retail industry. Indeed, the online retail industry has begun to largely eclipse the brick and mortar (B&M) retail industry in many product categories, such as book purchases. Nevertheless, one advantage the typical B&M has over the online counterpart is the relatively undivided attention of the consumer. For example, when the potential customer walks into a consumer electronics store, the potential customer does not have an infinite number of possible options and entertainment distracting him or her from the purchase. On the other hand, while browsing a typical retailer website, the user is offered up an almost limitless number of entertainment options that will derail the typical purchase right up to the very end. Quite simply, right up into the clicking of the "complete order" button, the user may click away from the transaction at any point and most of the progress is lost. One approach to this issue is to store a cookie file on the user's computer, which identifies the unknown user to the retail website and provides a way to restore the transaction data when the user returns.

SUMMARY OF THE INVENTION

In view of the foregoing background, it is therefore an object of the present invention to provide a communication system that efficiently handles commercial transactions.

This and other objects, features, and advantages in accordance with the present invention are provided by a communication system that may comprise at least one server, and a computing device communicating with the at least one server and comprising a display, and a processor cooperating therewith. The processor may be for receiving commercial transaction content from the at least one server and presenting the commercial transaction content on the display, detecting a first trigger event causing a removal of the commercial transaction content from the display and presenting new content from the at least one server on the display, and presenting the new content and an overlay window on the display, the overlay window including the commercial transaction content. Advantageously, when the user attempts to navigate away from the commercial transaction content, the user is presented with the overlay window for completion of the transaction.

In some embodiments, the at least one server comprises a single server providing both the new content and the commercial transaction content to the computing device. In other embodiments, the at least one server comprises first and second servers, and the first server may provide the new content to the computing device. The second server may provide the commercial transaction content to the computing device, and the first server may provide a proxy server for communicating the commercial transaction content between the second server and the computing device.

More specifically, the processor may be for operating the new content and the overlay window on the display independently, and independently receiving input for the new content and the overlay window. The computing device may comprise, for example, at least one a personal computer, a tablet computing device, or a mobile wireless communications device.

Additionally, the processor may detect the first trigger event comprising at least one of a selection of a webpage hyperlink, an elapse of a set time period, and an actual display of the new content on the display. The new content may have a time duration, and the first trigger event may comprise an elapsing of a portion of the time duration. The processor may be for upon detection of the first trigger event, sending associated data from the commercial transaction content to the at least one server, and the at least one server may provide the overlay window to the computing device based upon the associated data.

The processor may also be for detecting a second trigger event causing the removal of the commercial transaction content from the display and presenting content from another server, storing associated data from the commercial transaction content, detecting a third trigger event presenting content from the at least one server on the display, and presenting the content and the overlay window on the display. The at least one server may comprise a web server, and the commercial transaction content may comprise an online purchase transaction, and the new content may comprise a non-commercial website page. For example, the new content may comprise at least one of video content and a HyperText Markup Language (HTML) web page. Also, the at least one server may process the commercial transaction content and the new content to determine at least one subject matter attribute, and insert at least one advertisement in the commercial transaction content and the new content based upon the at least one subject matter attribute.

Another aspect is directed to a method of operating a computing device communicating with at least one server. The method may comprise receiving commercial transaction content from the at least one server and presenting the commercial transaction content on a display of the computing device, detecting a first trigger event causing a removal of the commercial transaction content from the display and presenting new content from the at least one server on the display, and presenting the new content and an overlay window on the display, the overlay window including the commercial transaction content.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
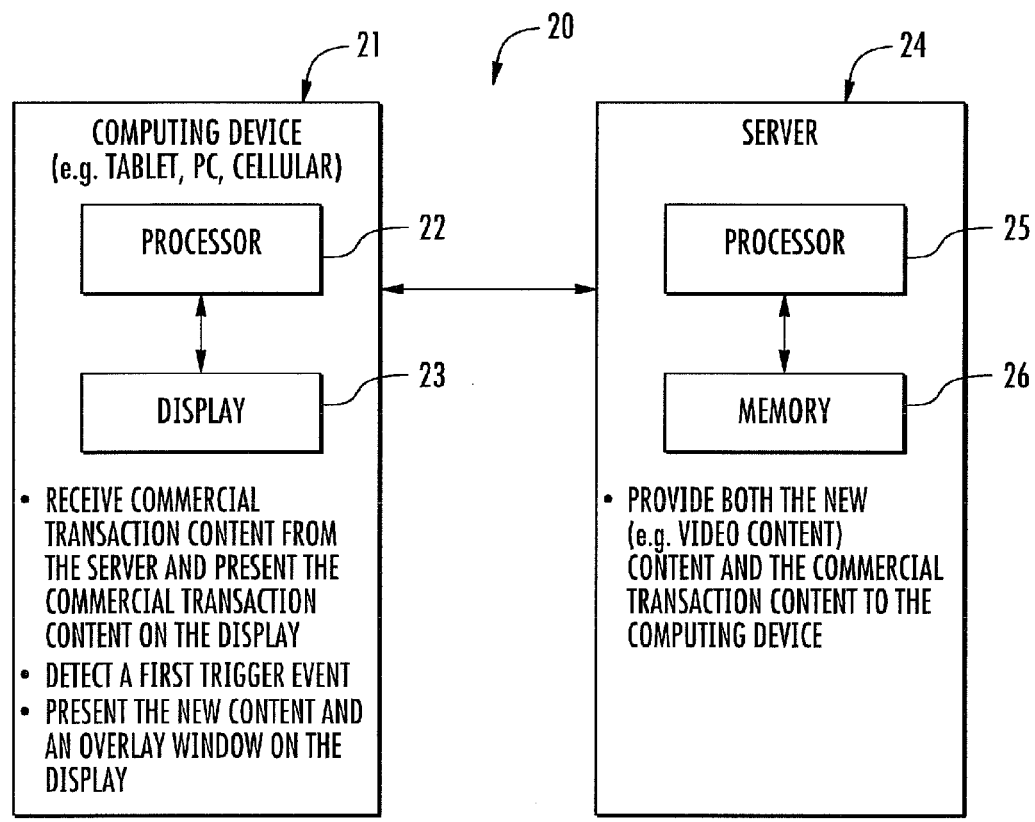
FIG. 1 is a schematic diagram of a communication system, according to the present invention.

Referring now to FIG. 1, a communication system 20 according to the present invention is now described. The communication system 20 illustratively includes a server 24, and a computing device 21 communicating with the server. The computing device 21 illustratively includes a display 23, and a processor 22 cooperating therewith. The processor 22 is for receiving commercial transaction content from the server 24 and presenting the commercial transaction content on the display 23, and detecting a first trigger event causing a removal of the commercial transaction content from the display and presenting new content from the server on the display. For example, the trigger event may comprise at least one of a selection of a webpage hyperlink, an elapse of a set time period, and an actual display of the new content on the display 23. Also, in some embodiments, the new content may have a time duration, and the first trigger event may comprise a elapsing of a portion of the time duration.

The processor 22 is for presenting the new content and an overlay window on the display 23. The overlay window includes the commercial transaction content. In particular, the overlay window comprises a shortened/compacted version of the commercial transaction content. In the illustrated embodiment, the server 24 comprises a single server providing both the new content and the commercial transaction content to the computing device.

Advantageously, when the user attempts to navigate away from the commercial transaction content, the user is presented with the overlay window for completion of the transaction. In other words, while the user is viewing the new content, there is an overlay window presented to the user that provides the same one-click "complete" purchase button that would presented at the end of a typical online transaction. Differently from the typical cookie file approaches, the user is consistently reminded of the in-progress purchase while the user views the new content.

More specifically, the processor 22 operates the new content and the overlay window on the display independently, and independently receiving input for the new content and the overlay window. In other words, the input directed to the new content has no effect on the commercial transaction content in the overlay window and vice-versa. The computing device 21 may comprise, for example, at least one a personal computer, a tablet computing device, or a mobile wireless communications device.

The processor 22 is also for upon detection of the first trigger event, sending associated data from the commercial transaction content to the server 24, and the server provides the overlay window to the computing device 21 based upon the associated data. In some embodiments, the processor 22 may serialize the associated data for transmission to the server 24.

The processor 22 is also for detecting a second trigger event causing the removal of the commercial transaction content from the display 23 and presenting content from another server. In other words, for example, the user is leaving the website of the server 24. The processor 22 then stores the associated data from the commercial transaction content in on-board memory (not shown), detects a third trigger event presenting content from the server 24 on the display, and presents the content and the overlay window on the display 23.

The server 24 illustratively includes a processor 25, and a memory 26 coupled thereto. In some embodiments, the server 24 may comprise a web server, and the commercial transaction content may comprise an online purchase transaction. The new content may comprise a non-commercial website page. For example, the new content may comprise at least one of video content and an HTML web page. Also, the server 24 may process the commercial transaction content and the new content to determine at least one subject matter attribute, and insert at least one advertisement in the commercial transaction content and the new content based upon the at least one subject matter attribute. In some embodiments, the communication system 20 includes a separate advertisement server (not shown) for providing the at least one advertisement to the server 24, but in other embodiments, the server may also include the advertisement server therein. Also, the server 24 may include a subject matter attribute database therein including preprocessed attribute data for particular content.

Figure 2:
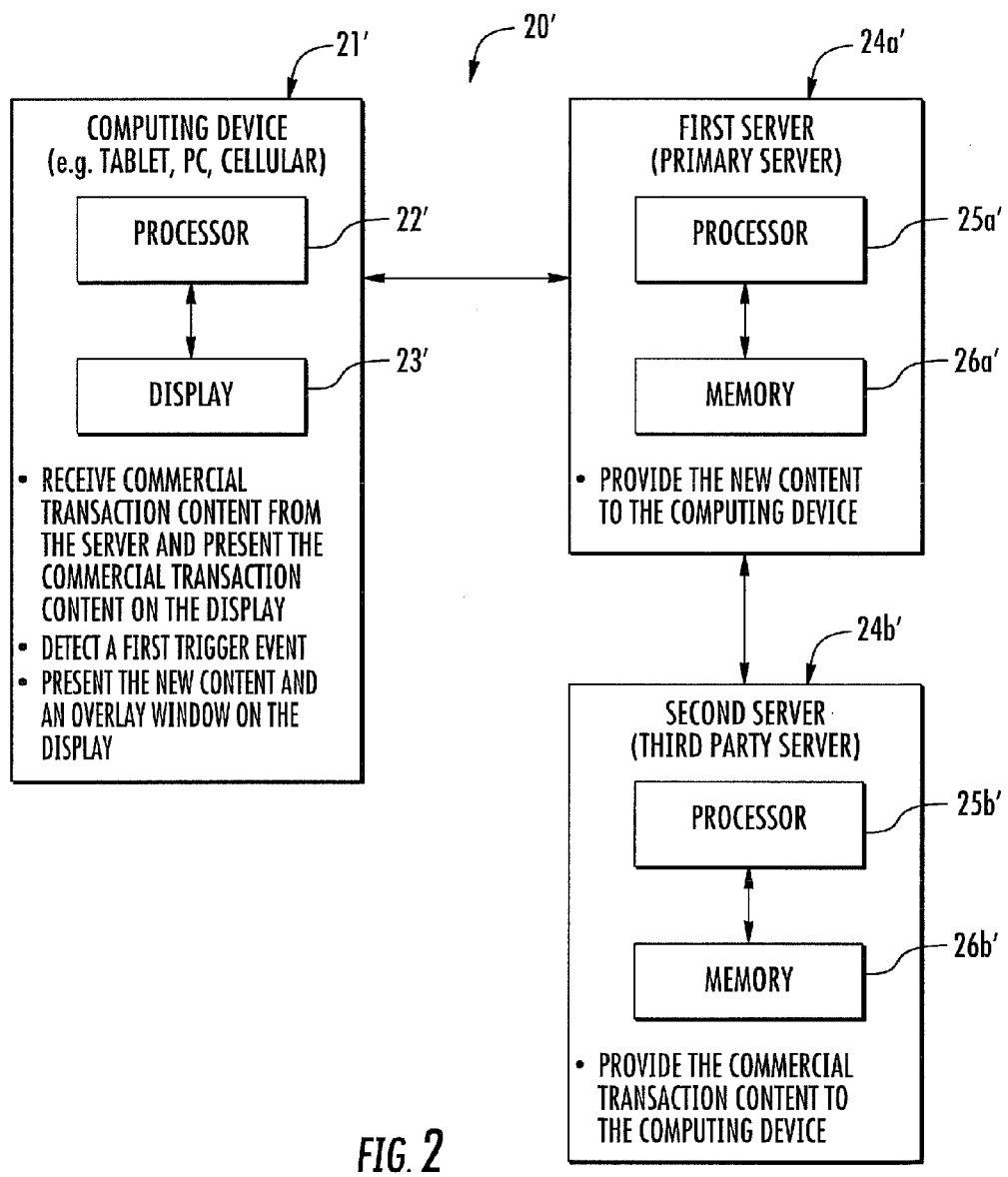
FIG. 2 is a schematic diagram of another embodiment of a communication system, according to the present invention.
Figure 3:
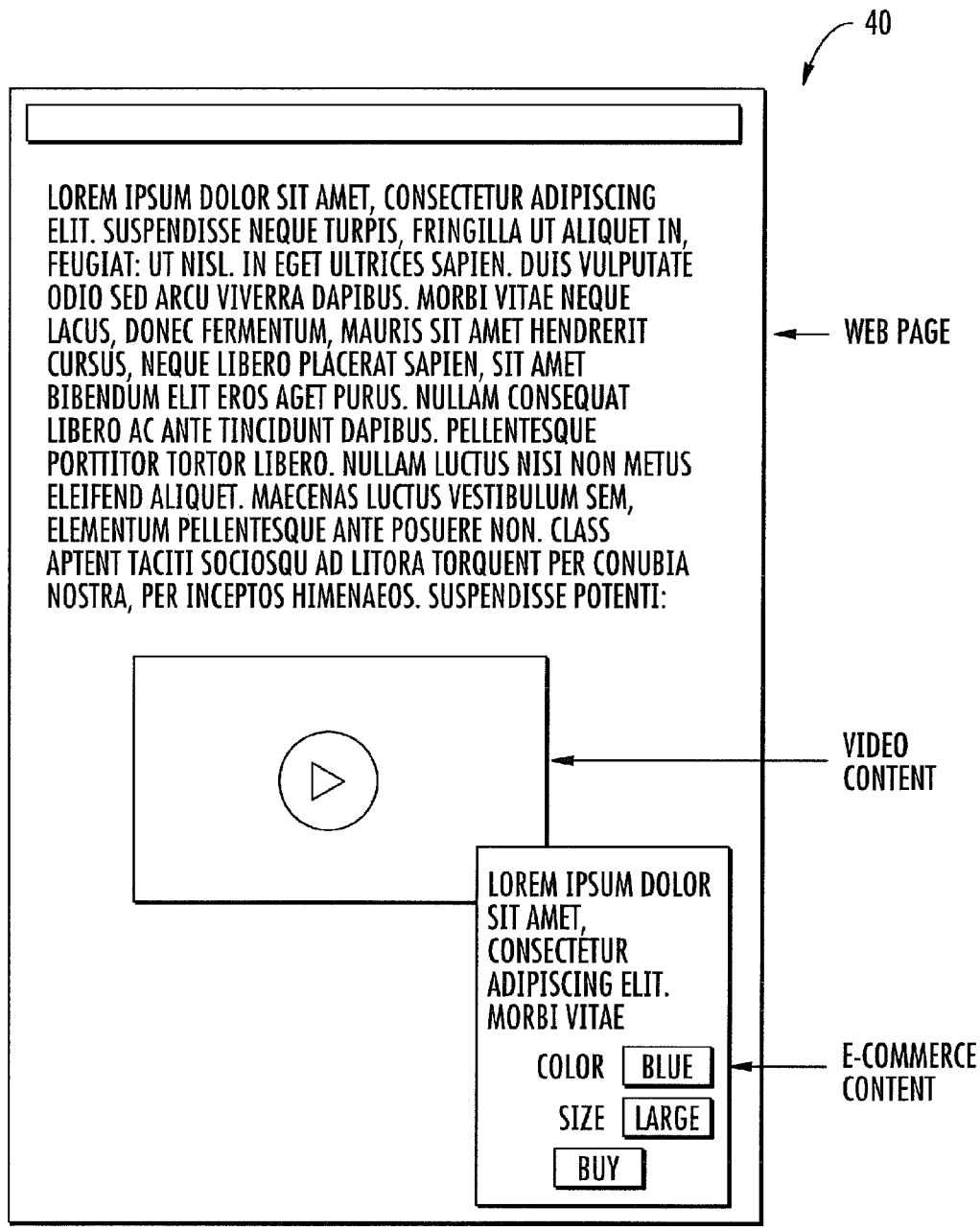
FIG. 3 is a schematic diagram of a web page having video content and e-commerce content from an exemplary embodiment of the communication system of FIG. 1.
Figure 4:
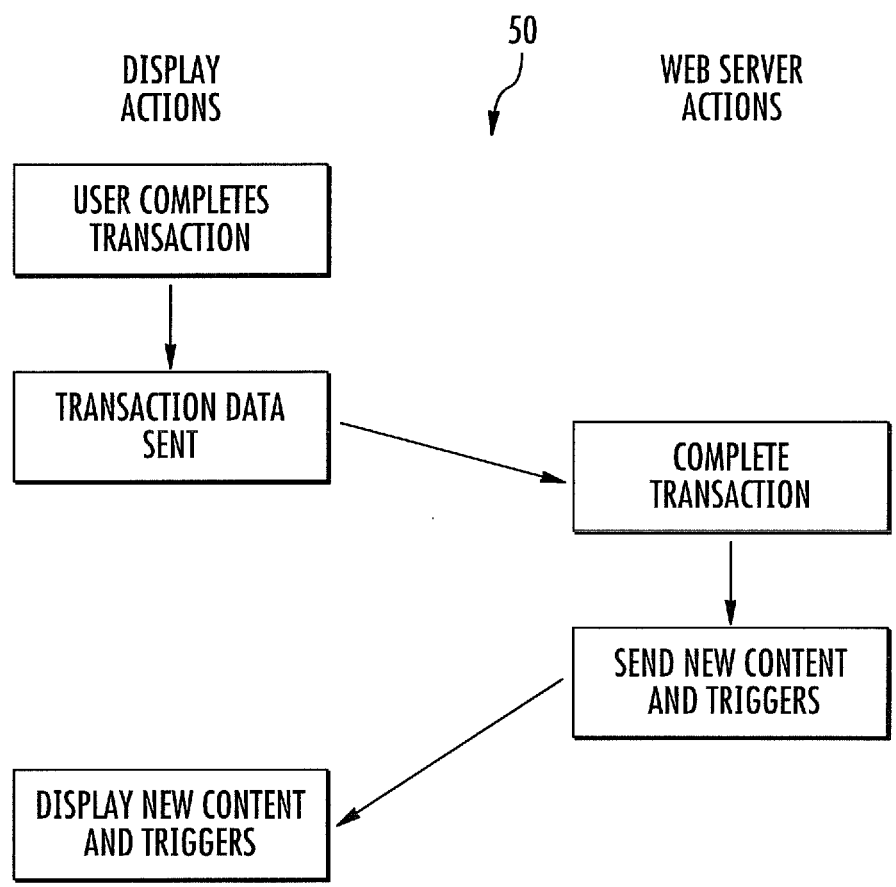
FIG. 4 is a flowchart of an End Transaction process from an exemplary embodiment of the communication system of FIG. 1.
Figure 5:
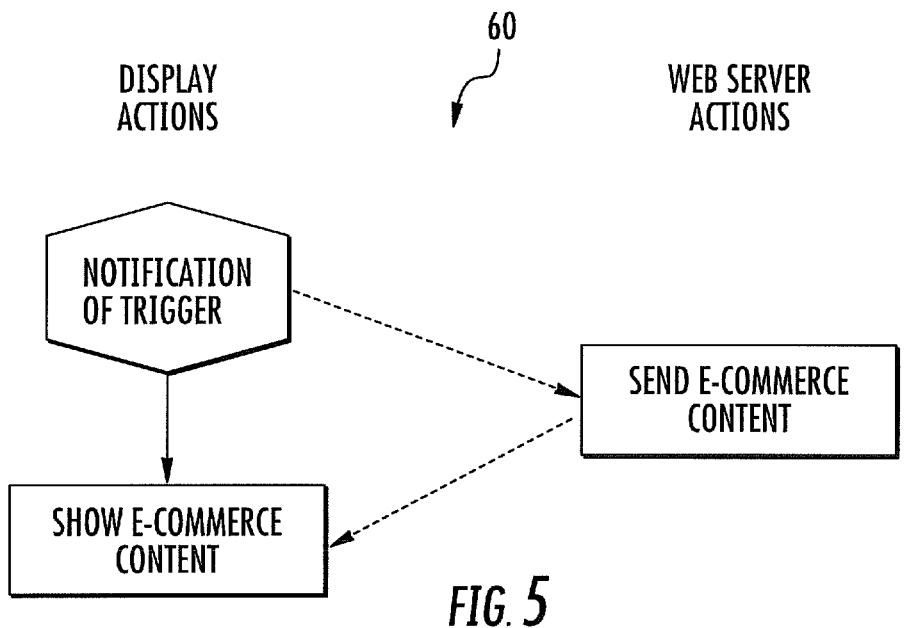
FIG. 5 is a flowchart of a Begin E-commerce Transaction process from an exemplary embodiment of the communication system of FIG. 1.
Figure 6:
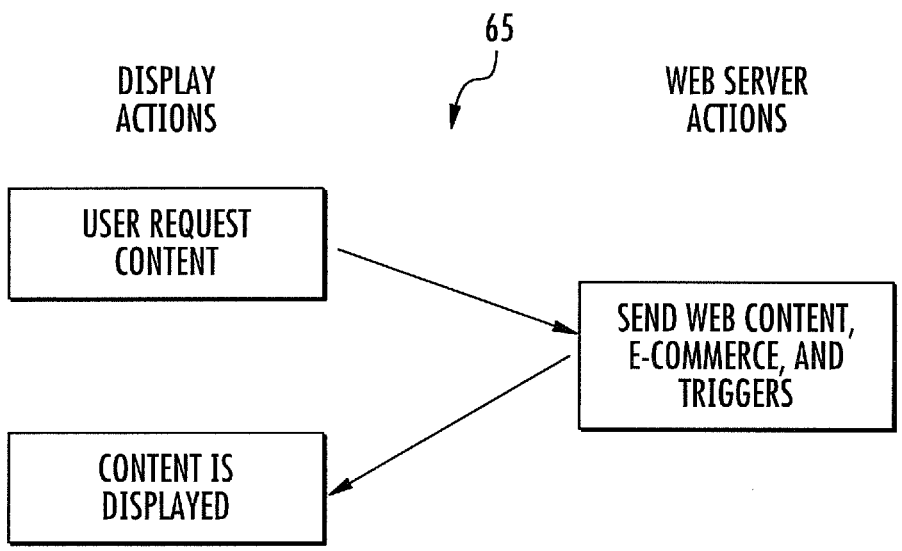
FIG. 6 is a flowchart of a Content Setup process from an exemplary embodiment of the communication system of FIG. 1.
Figure 7:
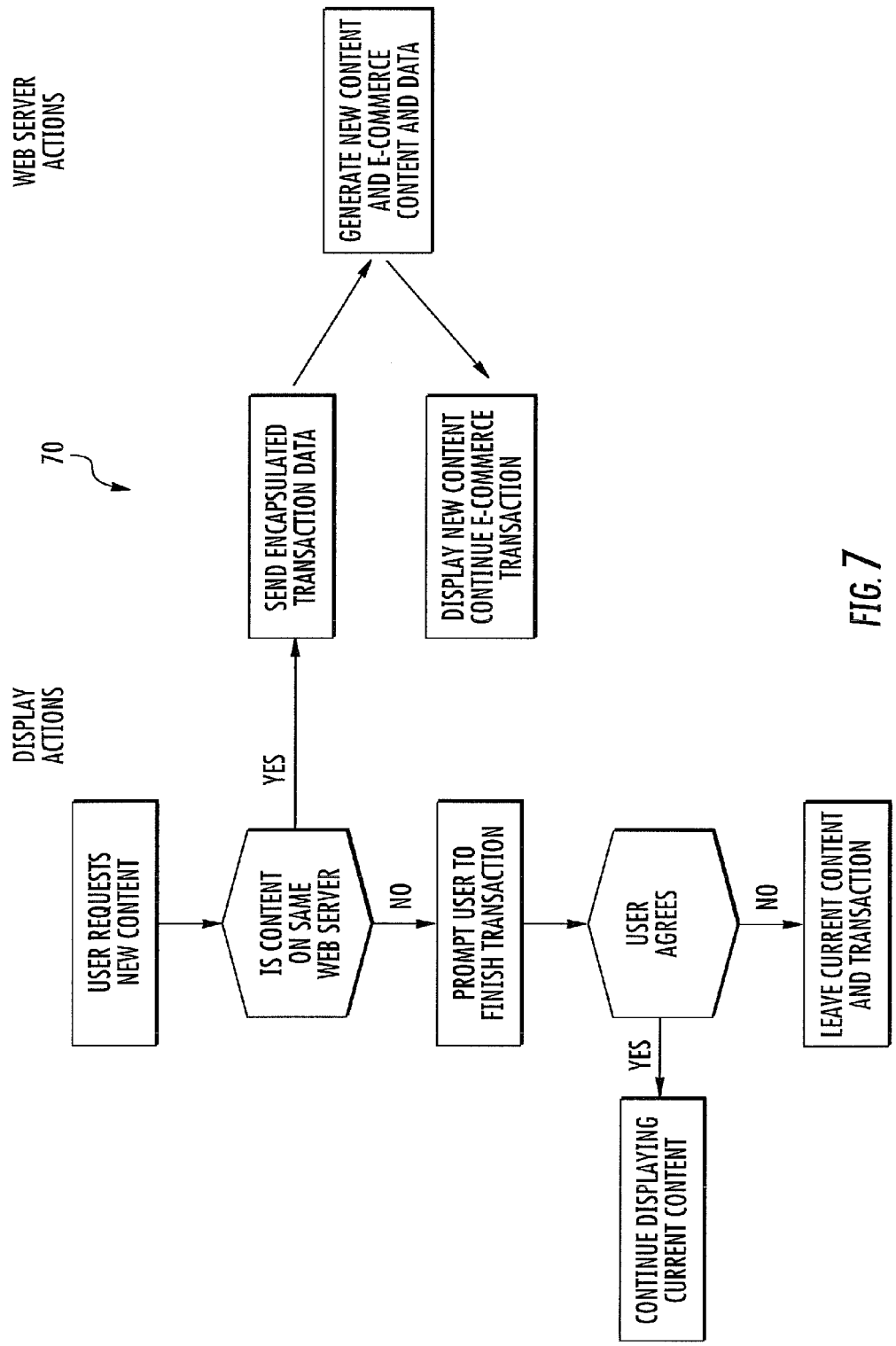
FIG. 7 is a flowchart of a Persistent Transaction process from an exemplary embodiment of the communication system of FIG. 1.
Figure 8:
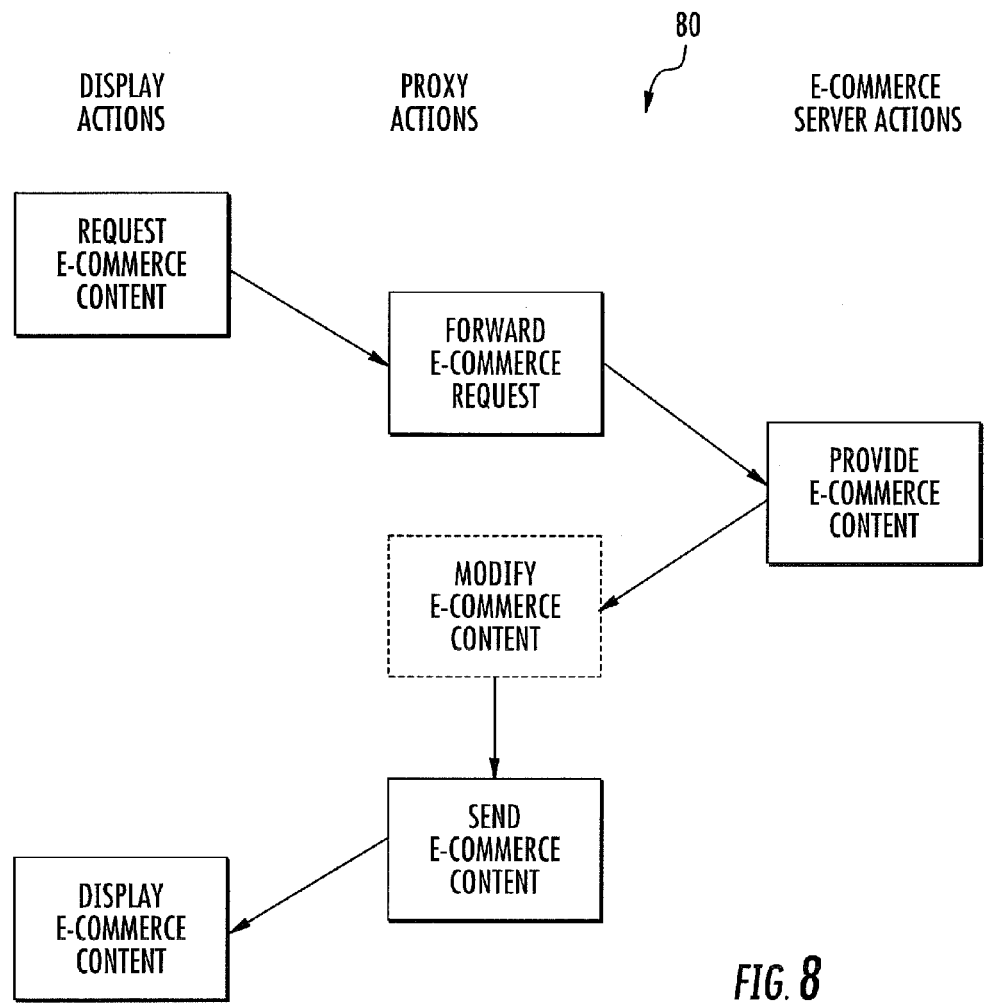
FIG. 8 is a flowchart of a Proxy E-commerce Server process from an exemplary embodiment of the communication system of FIG. 1.
Figure 9:
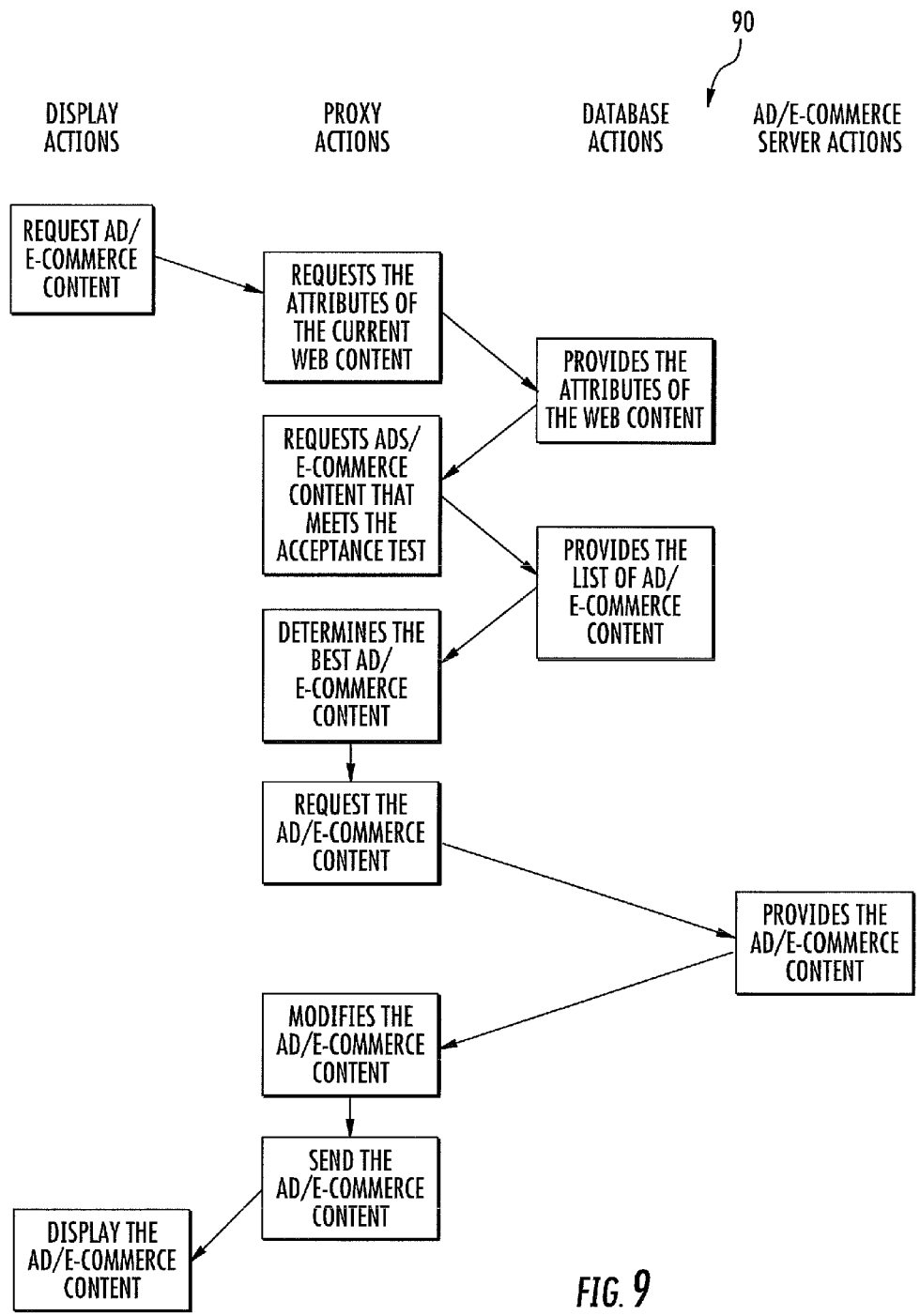
FIG. 9 is a flowchart of an advertisement/e-commerce selection process from an exemplary embodiment of the communication system of FIG. 1.

Referring now additionally to FIG. 2, another embodiment of the communication system 20' is now described. In this embodiment of the communication system 20', those elements already discussed above with respect to FIG. 1 are given prime notation and most require no further discussion herein. This embodiment differs from the previous embodiment in that this communication system 20' illustratively includes first and second servers 24a'-24b', the first server providing the new content to the computing device 21'. The second server 24b' provides the commercial transaction content to the computing device 21', and the first server 24a' provides a proxy server for communicating the commercial transaction content between the second server and the computing device.

Another aspect is directed to a method of operating a computing device 21 communicating with at least one server 24. The method may comprise receiving commercial transaction content from the at least one server 24 and presenting the commercial transaction content on a display 23 of the computing device 21, detecting a first trigger event causing a removal of the commercial transaction content from the display and presenting new content from the at least one server on the display, and presenting the new content and an overlay window on the display, the overlay window including the commercial transaction content.

Referring now to FIGS. 3-9, exemplary embodiments of the communication system 10 are now described. Embodiments of the present invention may include systems for embedding e-commerce transactions within a web site so that a customer can interact normally with the website without impacting an ongoing transaction. As a result, an improvement may be made to the sales experience for the customer by not interrupting their viewing experience to conduct a sale. Embodiments of the invention herein described may work with any content on a web site or other internet device that can exchange data.

Embodiments of the invention may comprise a process having a web server and an e-commerce server residing on a same system; a process that allows for the e-commerce server to reside on a different machine than the web server by employing a proxy server on the same machine as the web server; a process wherein web content and e-commerce content are matched so that the content is appropriate for an ad/e-commerce content being shown; a combination of the above wherein a server selects the ad/e-commerce content that is appropriate for the content without the use of an external advertisement server; a combination of the above wherein remote ad/e-commerce content is served that is appropriate for the content being displayed; and further combinations thereof.

By way of example, processes may be described in various embodiments or embodiments of embodiments described as follows. In a first embodiment the web server and the e-commerce server reside on the same system, herein described as embodiment #1 that may comprise:

1. A customer instructs his display to connect to a web server.
2. The web server provides content to the display which may also contain e-commerce content, and a set of triggers and commands for accessing e-commerce content.
3. The display shows the content for the customer.
4. A trigger occurs. A trigger may be initiated by:
    1. The customer clicking on a piece of content;
    2. A timer waiting a specified period of time;
    3. Some other signal being received;
    4. The display of indicated content; and
    5. At any specified point within a piece of content that has a duration.
5. The display contacts the e-commerce server to retrieve the e-commerce content if necessary.
6. The display shows the e-commerce content.
7. Data is collected from the customer's interactions with the e-commerce content.
8. The display intercepts customer actions that would display new content and disrupt the e-commerce transaction.
9. The display encapsulates the transaction data and the e-commerce content.
10. If the request would lead to the user leaving the site, the display sends the cookie and the e-commerce data is stored in a database.
11. The display then requests the new content from the web server perhaps after an extended delay.
12. The web server provides not only the new content, but also the e-commerce content and the transaction data. If the user has left the site, the cookie is used to retrieve the e-commerce content from the database.
13. The display shows the content and restores the e-commerce content to the same point prior to the request for new content by using the encapsulated transaction data.
14. Steps 7 through 13 are repeated as necessary.
15. If the customer completes the transaction:
    1. The transaction data is sent to the web server;
    2. The web server clears the state that indicates a transaction is in progress;
    3. New content may be sent to indicate the transaction has completed
    4. New triggers may be added to the content to allow a new transaction to begin
16. If the customer requests to leave the web site without completing the transaction
    1. The request is intercepted;
    2. The web server may be informed of the customer's request;
    3. The web server may provide new content to the display;
    4. The display may show content to the customer requesting that they finish the transaction before leaving the website.

A second embodiment of this process, allows for the e-commerce server to reside on a different machine than the web server by employing a proxy server on the same machine as the web server. Embodiment #2 may comprise:

1. Steps 1 through 4 as described above are performed as in embodiment #1.
2. The display contacts a proxy server to retrieve the e-commerce content;
3. The proxy server contacts the e-commerce server to retrieve the e-commerce content;
4. The proxy server rewrites the e-commerce content:
    1. References to the e-commerce server are rewritten so that when the customer interacts with the content, any data is sent to the proxy server rather than the e-commerce server; and
    2. The content may be changed to alter the appearance
5. Steps 6 through 16 are performed as in embodiment #1.

In the third embodiment, web content and e-commerce content are matched so that the content is appropriate for the ad/e-commerce content being shown. Embodiment #3 may comprise:

1. Steps 1 and 2 performed as in embodiment #2 described above.
2. The advertisement server consults a database that includes a list of attributes that describe the content.
3. The advertisement server consults a database of ads/e-commerce content that are available and a list of acceptance tests associated with each ad.
4. The advertisement server determines which ad/e-commerce content meets the acceptance tests:
    1. For each acceptance test associated with the ad/e-commerce content
    2. Attempt to locate the corresponding descriptor in the content attributes.
    3. If the attribute is found, make sure it is within the range of the acceptance test.
    4. If the attribute is not found and the acceptance test is not set to the entire range of acceptance values, then reject the content as being inappropriate.
5. The advertisement server then determines which ad/e-commerce content is the best choice based on the attributes
    1. Considering the ad/e-commerce content that was not rejected.
    2. Calculate a score for the ad/e-commerce content based on how close the advertisement is to the optimal value, the weight of that particular acceptance test, and the price paid for the ad.
6. Steps 3 through 5 are performed as in embodiment #2.

Embodiment #4 may combine embodiment #1 with embodiment #3, resulting in a server that selects ad/e-commerce content that is appropriate for the content without the use of an external advertisement server. Embodiment #5 may combine embodiments #1, #2, and #3 to create a configuration that serves remote ad/e-commerce content that is appropriate for the content being displayed.

Embodiment #1 starts when the customer requests that his or her display connect to a website. In the typical case, the display is a web browser on your computer. The display referred to in this document is also applicable to mobile devices, such as mobile phones or tablets. The display may also comprise a DVD player, a set top box, a digital video recorder (DVR), a game system, or a television that includes internet connectivity.

The website is a system that provides content for the display. One case would include a web server available over the internet, but other implementations would also apply such as content stored on a DVD/BluRay and provided by software running on the display hardware. An example of this would be a game system that provided data on the disc, or a DVR showing video content, or a BluRay player with enhanced content.

The content provided by the web server will likely include a mix of text, audio, video, user interface controls, and the triggers. In the case of a web browser, the content would a page of HTML perhaps with video elements. The user interface components would include links to other pages on the site and perhaps links to other sites, as well as controls for playing embedded video. This content operates as it normally would on the display. The content will include a tracking cookie. This cookie is stored in the display system and can be retrieved at a later time. Other methods for tracking a unique visitor could be employed such as a customer's login to the website, a unique identifier connected to the hardware, or other data that unique identifies the customer or the display. This process of requesting and displaying content is illustrated with reference to a flowchart 65 of FIG. 6: Content Setup.

A first method of activating a trigger may comprise the customer taking an action. The customer might activate a link to go to a new page or might start a video playing by activating a play button. For a web browser these actions would be activated by clicking on them with a mouse, and for a mobile device, it might involve pressing on the screen with a finger, with a DVD player a remote control may use up, down, left, right buttons to navigate and an additional button to select. Additionally, a trigger may be defined to activate when the content has been shown on the display.

A second method of activating a trigger would be to wait a period of time after some other trigger is activated. For example, a trigger may activate some period of time after the customer starts a video playing, after the customer activates a link, or after the content is displayed.

Triggers may also be activated by the completion of a timed based piece of content. For example, when a video completes, when the customer finishes playing a game, or when a sound finishes be played. External signals may also activate triggers. An external signal might be a network packet, a button press on a remote control, or any other method the display has for interacting with the customer.

Once a trigger is activated, software running on the display is activated. The software will determine what e-commerce content to display and where to display it. That information may have been provided when the original content was provided by the web server. For example, it might have been included on a BluRay disc and made available when the trigger activates. If the display is connected to the internet, the software may contact the web server to retrieve the e-commerce content at this time.

At this point, the e-commerce content is displayed. Again, this content has the full range of capabilities that are available on the display for displaying audio, video, text, or other interactive content. The customer may now interact with the original content or the e-commerce content. The e-commerce content is displayed as an overlay window or in a reserved section of the content.

The e-commerce content will persist on the screen as long as the customer is viewing the original content or other content provided by the web server. The customer has the ability to interact with the content and the e-commerce content. From the customer's perspective, the two sets of content can be completely independent. No changes the customer makes to the original content need affect the e-commerce content and no changes to the e-commerce content need change the original content. The process of retrieving and displaying the e-commerce transaction is illustrated with reference to a flowchart 60 of FIG. 5. An example of content 40 with e-commerce content being displayed is illustrated with reference to FIG. 3: Web Page.

Software on the display processes certain customer actions to get this behavior. These actions may cause the display to load new content, which would erase the display. In order to preserve the e-commerce content, several steps need to happen. Any action that would force the display to erase the e-commerce content must be trapped and processed by the software. For example, in HTML, clicking a link would cause the display to redraw the content. The web browser generates an event prior to this occurring. The software loaded with the content will catch this event and perform steps to save the e-commerce content.

The software will store the e-commerce content that is being displayed. The first step in saving the content is to serialize the entire set of e-commerce content and send it back to the web server. With a web browser, JavaScript contains functions that allow software to examine all the components in the display and build a string representation in a format called JSON. The serialized data includes the text, audio, video, and the complete state of all interactive content. The e-commerce content is sent to the web server along with the tracking cookie, and then the request for new content is completed.

As the new content is delivered to the display by the web server, the serialized data is returned along with it. The display then executes the software to convert the serialized data back to the e-commerce data for the display. This is the reverse of the process to create the serialized data inserting the HTML back in to the display and then setting the user interface components to the state they were in prior to the action.

The web server must also catch events that would cause the customer to leave the web site or visit other content not under our control. When these events are caught the data is sent to the web server as before, but it will be held until the customer returns or until it is no longer useful. The web server will associate the e-commerce content with the cookie. The next time the customer visits the website, the cookie will be sent by the display, the e-commerce content will be looked up, and the e-commerce transaction will resume at the same point as when the customer last visited.

The web server will store the data on a disk or in a database. The data will be associated with a unique cookie on the web server. The cookie allows the web server to identify the customer when he or she returns to the site. Once the cookie is retrieved, the saved e-commerce data is then retrieved and sent back with the next content the customer requests. This process of saving the e-commerce content, displaying it at the next opportunity, and resetting the triggers is illustrated with reference to a flowchart 70 of FIG. 7.

The e-commerce content may provide a user interface component that allows the customer to remove the content from the screen. In that case, the e-commerce content is removed and the triggers are reset so that the e-commerce content can be displayed again at an appropriate time. It is also possible for new e-commerce content to be shown the next time the trigger activates.

When the customer finishes interacting with the e-commerce content and completes the e-commerce transaction, then the transaction data is sent to the web server to perform the transaction. A response indicating that the transaction has completed successfully will usually be displayed. At this point the e-commerce content can be removed and the triggers reset to display new e-commerce content when the trigger activates. This process of completing a transaction and resetting the system to perform the next transaction is illustrated with reference to a flowchart 50 of FIG. 4.

Embodiment #2 is a modification to embodiment #1 that allows the e-commerce content to be served by a system other than the web server. In order for a web page to provide security the connection from the display to the web server is encrypted. This encryption is performed by SSL and shows up to the customer as a lock on the URL bar. This encryption also prevents a display from mixing content from two different web servers. Therefore to allow third parties to embed e-commerce transactions in a website, another embodiment is provided.

Embodiment #2 works identically to embodiment #1, until the process reaches the point where the e-commerce content is provided to the display. Rather than having the display directly connect to the third party e-commerce server, instead it connects to a proxy server running on the web server. The proxy server is a piece of software that will act as an intermediary between the web server and the content provider to allow the secure transaction.

When the proxy server receives a request for content, it contacts the third party e-commerce content server and retrieves the e-commerce content. The content from the third party e-commerce content server may include references to other content located on the e-commerce site. Links to those references are re-written to be directed through the proxy server. When the display attempts to access this data a later time, the request will go to the proxy server to be processed. Once the content is re-written, it is provided to the display. That way, all content appears to come from the web server, and the security is maintained. The process of using a proxy server to serve third party e-commerce content is shown in a flowchart 80 of FIG. 8.

Embodiment #3 is designed to make sure that advertising and e-commerce content are matched with appropriate content. This can be used to prevent alcohol ads being shown next to content for children, for example. An advertisement server provides the matching service. In this configuration, the content web server provides software to the display causing it to send a list of content URLs to the advertisement server. These URLs include all the content that is being shown by the display. The advertisement server will process these URLs and return appropriate advertising or e-commerce content.

The advertisement server looks up each URL in a database. The database maps each URL to a series of attributes that describe the content. Each attribute scores the content on a particular aspect with a numerical value, for example, from 0-10. Attributes might include things like violence, foul language, or nudity. Attributes might also be used to indicate brands that are highlighted in the advertisement. For example, the presence of a Pepsi drink, a ford car, or Nike shoes might be attributes.

The advertisement server contains a list of e-commerce or advertising content that could potentially be displayed. Each of these has a set of acceptance tests that score how well the advertisement/e-commerce content is matched to the content. These acceptance tests are represented as a range of acceptable values, an optimal value, and a weight for a particular attribute. For example, an advertisement may want to indicate that no violence is acceptable in which case its acceptance range would be 0 to 0, and its optimal value would be 0. If some foul language is acceptable, but not desired, then a range of 0-5 and an optimal value of 0 might be appropriate. A Pepsi advertisement might prefer to be shown with Pepsi content, but not want to be shown with Coca-Cola content, so they might say the range for Pepsi would be 0-10 with an optimal value of 10, and a Coca-Cola range of 0 to 0 with an optimal value of 0.

The weight allows multiple acceptance tests to be combined together to make a single result. The method for combining these values would be as follows.

1. For each acceptance test, check the attribute for the video. If the video has a value outside the range, then the video is rejected.

2. If the minimum value of the range is not 0, and the video does not have the attribute set, then the video is rejected.

3. Otherwise a score is created by taking the absolute value of the optimal value from the acceptance test and subtracting the actual value from the attribute.

4. This score is multiplied by the weight value and added to all the scores previously computed for this advertisement.

The advertisement/e-commerce content with the highest score is selected and provided by the advertisement server to the display. This process of selecting advertising/e-commerce content is illustrated with reference to a flowchart 90 of FIG. 9.

Embodiment #4 shows that the advertisement proxy server could be included on the same system as the content server. The processing taking place does not change.

Embodiment #5 combines embodiment #1, embodiment #2, and embodiment #3. There are two different servers one for the e-commerce content and one for the advertisement content. The e-commerce proxy would be run on a second server. The advertisement server may be on the web server or run on a separate server as in embodiment #4.

Typical systems allow advertising content to be displayed on a website or perform e-commerce transactions, but they do not allow e-commerce transactions to be displayed along with content. Embodiments of the present invention provide that the entire e-commerce transaction occurs while the primary content is still being shown and interacted with. It is desirable to not disrupt the customers viewing experience. Typical other solutions will display an advertisement for the product, but will require the customer to go to some other site or page to perform the purchase. Embodiments of the invention provide all the content necessary to perform the transaction. In addition, embodiments of the invention provide that an e-commerce transaction is persistent as the user moves between different content on a site. This allows the user to continue watching and interacting with the primary content while performing the e-commerce transaction. Other solutions stop the content, redirect the user to a new page, or redirect the user to a new site. These actions disrupt the users experience viewing the content.

Embodiment #3 and embodiment #5 add the capability to do targeted advertisement selection based on the content being displayed on the site. The goal of the system is to ensure that advertisers can place their advertisements on sites with content appropriate for their product. Current advertisement selection systems use customer demographics or keywords to do advertisement selection, but do not select advertisements based upon broader attributes of the content being shown.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the claims supported by this specification.

That which is claimed is:

1. A communication system comprising:
    first and second servers; and
    a computing device communicating with said first and second servers and comprising a display, and a processor cooperating therewith for
        receiving commercial transaction content from said second server and presenting the commercial transaction content on said display,
        detecting a first trigger event causing a removal of the commercial transaction content from said display and presenting new content from said first server on said display,
        the commercial transaction content comprising a partially complete commercial transaction, the new content being different from and unrelated to the commercial transaction content from a different source, and
        presenting the new content and an overlay window on said display, the overlay window including a shortened version of the commercial transaction content and concurrently permitting, while viewing both the new content and the shortened version of the commercial transaction content, completion of the partially complete commercial transaction, and navigation of the new content.

2. The communication system of claim 1 wherein said first server provides a proxy server for communicating the commercial transaction content between said second server and said computing device.

3. The communication system of claim 1 wherein said processor is for:
    operating the new content and the overlay window on said display independently; and
    independently receiving input for the new content and the overlay window.

4. The communication system of claim 1 wherein said computing device comprises at least one a personal computer, a tablet computing device, or a mobile wireless communications device.

5. The communication system of claim 1 wherein said processor detects the first trigger event comprising at least one of a selection of a webpage hyperlink, an elapse of a set time period, and an actual display of the new content on said display.

6. The communication system of claim 1 wherein the new content has a time duration, the first trigger event comprising a elapsing of a portion of the time duration.

7. The communication system of claim 1 wherein said processor is for upon detection of the first trigger event, sending associated data from the commercial transaction content to said second server; and wherein said second server provides the overlay window to said computing device based upon the associated data.

8. The communication system of claim 1 wherein said processor is for:
    detecting a second trigger event causing the removal of the commercial transaction content from said display and presenting content from another server;
    storing associated data from the commercial transaction content;
    detecting a third trigger event presenting content from said at least one server on said display; and
    presenting the content and the overlay window on said display.

9. The communication system of claim 1 wherein said first server comprises a web server; wherein the commercial transaction content comprises an online purchase transaction; and wherein the new content comprises a non-commercial website page.

10. The communication system of claim 1 wherein said first and second servers process the commercial transaction content and the new content to determine at least one subject matter attribute, and insert at least one advertisement in the commercial transaction content and the new content based upon the at least one subject matter attribute.

11. A computing device communicating with first and second servers and comprising:
    a display; and
    a processor cooperating with said display for
        receiving commercial transaction content from said second server and presenting the commercial transaction content on said display,
        detecting a first trigger event causing a removal of the commercial transaction content from said display and presenting new content from said first server on said display,
        the commercial transaction content comprising a partially complete commercial transaction, the new content being different from and unrelated to the commercial transaction content from a different source, and
        presenting the new content and an overlay window on said display, the overlay window including a shortened version of the commercial transaction content and concurrently permitting, while viewing both the new content and the shortened version of the commercial transaction content, completion of the partially complete commercial transaction, and navigation of the new content.

12. The computing device of claim 11 wherein said processor is for:
    operating the new content and the overlay window on said display independently; and
    independently receiving input for the new content and the overlay window.

13. The computing device of claim 11 wherein said processor detects the first trigger event comprising at least one of a selection of a webpage hyperlink, an elapse of a set time period, and an actual display of the new content on said display.

14. The computing device of claim 11 wherein said processor is for upon detection of the first trigger event, sending associated data from the commercial transaction content to said second server; and wherein the overlay window is based upon the associated data.

15. The computing device of claim 11 wherein said processor is for:
    detecting a second trigger event causing the removal of the commercial transaction content from said display and presenting content from another server;

storing associated data from the commercial transaction content;

detecting a third trigger event presenting content from said at least one server on said display; and presenting the content and the overlay window on said display.

16. A method of operating a computing device communicating with first and second servers, the method comprising:

receiving commercial transaction content from the second server and presenting the commercial transaction content on a display of the computing device;

detecting a first trigger event causing a removal of the commercial transaction content from the display and presenting new content from the second server on the display, the commercial transaction content comprising a partially complete commercial transaction, the new content being different from and unrelated to the commercial transaction content from a different source; and presenting the new content and an overlay window on the display, the overlay window including a shortened version of the commercial transaction content, and concurrently permitting, while viewing both the new content and the shortened version of the commercial transaction content, completion of the partially complete commercial transaction, and navigation of the new content.

17. The method of claim 16 further comprising:

operating the new content and the overlay window on the display independently; and independently receiving input for the new content and the overlay window.

18. The method of claim 16 further comprising detecting the first trigger event comprising at least one of a selection of a webpage hyperlink, an elapse of a set time period, and an actual display of the new content on the display.

19. The method of claim 16 further comprising upon detection of the first trigger event, sending associated data from the commercial transaction content to the second server; and wherein the second server provides the overlay window to the computing device based upon the associated data.

20. The method of claim 16 further comprising:

detecting a second trigger event causing the removal of the commercial transaction content from the display and presenting content from another server;

storing associated data from the commercial transaction content;

detecting a third trigger event presenting content from the at least one server on the display; and presenting the content and the overlay window on the display.

* * * * *